| WHEEL POSITION | COUNT ACCUMULATION | COUNTING CIRCUIT OPERATION |
|---|---|---|
| 1 | BEGIN | COMPLETE CHAIN. PULSES TO BIT 1 |
| 2 | | BIT 1 REMOVED AND RESET. PULSES TO BIT 2 |
| 3 | | RETURN TO COMPLETE CHAIN. PULSES TO BIT 1 |
| 4 | STOP | READ BITS 2 ON AT ½ NORMAL DECIMAL VALUE |

INVENTOR.
WALTER A. BRAND, JR.

United States Patent Office 3,436,656
Patented Apr. 1, 1969

3,436,656
SPEED-MEASURING MEANS WITH POSITION-DETECTOR, ERROR-ELIMINATING MEANS
Walter A. Brand, Jr., Roanoke, Va., assignor to General Electric Company, a corporation of New York
Filed May 5, 1967, Ser. No. 636,341
Int. Cl. G01r 11/16
U.S. Cl. 324—70     3 Claims

ABSTRACT OF THE DISCLOSURE

For measuring vehicle speed, a system for determining the time required for a vehicle wheel to move from a position above a first detector to a position above a second detector. Each detector produces a first signal as the wheel approaches a location above the detector and a second signal as the wheel moves equally far beyond it. The first detector's first signal gates pulses to a counting chain whereas its second signal removes and resets the first chain bit and gates pulses to the second bit instead. Subsequently, the second detector's first signal gates pulses to the first bit again whereas its second signal halts count accumulation and permits reading of the chain without the first bit. The count read is inversely proportional to speed.

Background of the invention

The present invention relates to a speed measuring apparatus and more particularly to a circuit for improving the accuracy of such an apparatus.

One manner of determining the speed of a vehicle is to use a pair of spaced wheel proximity detectors as a form of on-off switch for a pulse counter. As a vehicle wheel passes over the first detector, the pulse counter begins to accumulate counts at a constant rate and continues to do so until the same vehicle wheel passes over the second detector to cause the pulse counter to stop accumulating counts. The accumulated count is directly proportional to the time required for the vehicle wheel to travel between the two detectors and is easily converted into terms of vehicle speed since the spacing between the detectors is known.

To illustrate the speed determining process, assume that the counting chain accumulates the count at the rate of 10,000 counts per second, that two wheel detectors are spaced 3 feet from one another along a railroad track, and that a wheel of a railroad train moving along the track allows the counting chain to accumulate 800 pulses as it travels between the detectors. Dividing the count accumulated by the rate of count accumulation shows that the wheel required .08 second to travel three feet. From this it may be seen that the train is traveling at the rate of 37.5 feet per second or 25.5 miles per hour.

For such a system to be reliably accurate, each detector should respond identically to the approach of a vehicle wheel. For instance, each detector should ideally respond when the vehicle wheel is immediately above it. However, manufacturing tolerances in the mounting and design of the detectors may, as a practical matter, make identical response quite difficult to achieve. An additional problem arises when such a system is used to determine the speed of railroad cars. The detectors normally used for this purpose respond when proximate to ferromagnetic material of the type used for railroad car wheels. As a railroad car wheel flange becomes worn, the wheel-to-detector spacing changes so that a detector does not necessarily respond identically for different railroad car wheels. However, regardless of the condition of the wheel, the detector may be made to respond symmetrically. That is, the detector may be designed to sense the approach of a wheel as it comes within a certain distance of the detector and to sense the departure of the same wheel as it moves an equal distance beyond the detector.

Summary of the invention

To minimize measurement errors caused by differences in wheel condition or detector mounting or construction, the present invention teaches electrical circuitry for providing a pulse count which reflects the time interval required for a wheel to travel from a position directly above a first detector to a position directly above a second detector. The system includes a counting chain which is selectively pulsed by a pulse generator means. Pulses are applied to the counting chain from the time a first detector first senses the approach of a vehicle wheel to the time a second detector senses the departure of the same vehicle wheel. A circuit means acts to approximately halve the counts accumulated (1) during the time interval between the time the first detector senses the approach of the vehicle wheel and the time that detector senses the departure of the vehicle wheel, and (2) during the time interval between the time the second detector senses the approach of the same vehicle wheel and the time that detector senses the departure of the vehicle wheel. When the counts accumulated during these last two time intervals are approximately halved and subtracted from the total count, the count remaining in the counting chain after the second detector has sensed the departure of the vehicle wheel is directly proportional to the time interval required for the wheel to travel from the position directly above the first detector to a position directly above the second detector.

Description of the drawings

While the specification concludes with claims particularly pointing out and distinctly claiming that which is regarded as the present invention, the details of one embodiment of the invention along wtih its further objects and advantages may be more readily ascertained from the following detailed description when read in conjunction with the accompanying drawings in which:

Detailed description

Figures 1, 2:
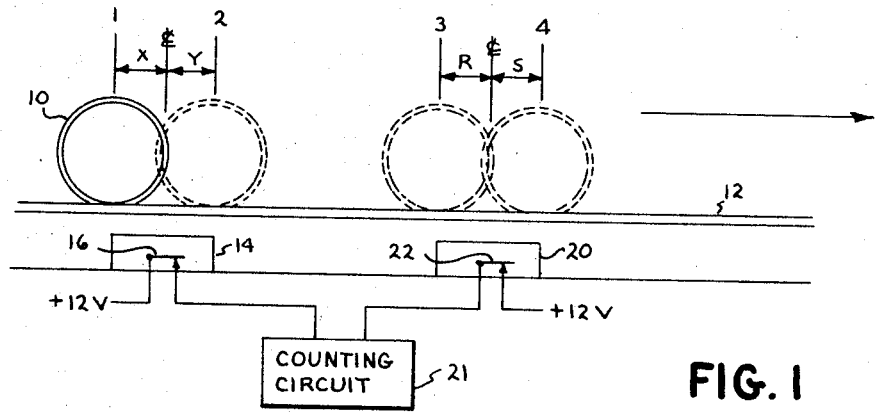
FIG. 1 depicts four time-varying positions for a single wheel relative to a pair of wheel detectors.
FIG. 2 is a table showing the condition and response of a circuit built in accordance with the present invention.

FIG. 1 shows a railroad car wheel 10 in four of the positions it would assume as it passes from left to right along the surface of a railroad track 12. As the wheel 10 reaches position 1 at a distance X from the center line of a first wheel detector 14, a switching member 16 in the wheel detector 14 is attracted upwardly by the ferromagnetic material in the wheel 10. An open circuit exists between a 12 volt source and a counting circuit 21 as the wheel 10 travels between the positions 1 and 2. When the wheel 10 reaches position 2 at a distance Y beyond the center line of the detector 14, the spacing between the wheel 10 and the switching member 16 becomes great enough to allow the switching member 16 to return to its closed position. Although the distances X and Y are equal to one another, the magnitudes of these distances vary according to the condition of the wheel 10 or the condition or location of the detector 14. For example, an unworn wheel causes the switching member 16 to be attracted upwardly sooner than a worn wheel. Similarly, the unworn wheel continues to attract the switching member 16 longer than a worn wheel. The same switching action occurs as the wheel 10 reaches position 3 at a distance R from the center line of a second wheel detector 20 spaced from the wheel detector 14 along the railroad track 12. That is, when the wheel 10 reaches position 3, a switching member 22 is picked up and remains picked up until the wheel reaches position 4 at a distance S beyond the center line of the wheel detector 20.

To minimize measurement inaccuracies caused by the fact that the distance from the center line of the wheel detectors to the positions 1 and 2 or 3 and 4 vary, the present invention makes use of the fact that the distance X is equal to the distance Y and, similarly, the distance R is equal to the distance S. The invention effectively compensates for the fact that the distance X or Y may not equal the distance R or S. A circuit constructed in accordance with the principles of the present invention allows counts to accumulate while the wheel passes from position 1 to position 2 and then effectively halves those counts in order to determine the number of counts accumulated while the wheel moves from the center line of the wheel detector 14 to the position 2. Similarly, the circuit allows counts to be accumulated as the wheel travels from position 3 to position 4 and then effectively halves those counts to determine the number of counts required for the wheel to travel from position 3 to the center line of the detector 20. When one half of the counts accumulated while the wheel travels from position 1 to position 2 and from position 3 to position 4 are subtracted from the total count, the remaining count is directly proportional to the time required for the wheel 10 to move from the center line of detector 14 to the center line of detector 20.

FIG. 2 is a summary of the response of the counting circuit 21 as the wheel 10 reaches positions 1, 2, 3, and 4. When the wheel 10 reaches position 1, pulses are applied to the first bit in a counting chain to cause a count accumulation to begin. The signal which initiates this operation is the decrease in voltage from the 12 volt source due to the opening of the switch member 16. As the wheel reaches position 2, the first bit in the counting chain is taken out of the circuit and is reset to contain a binary zero. The pulses are gated around the first bit to the input of the second bit in the counting chain, thereby effectively subtracting one half of the counts accumulated in the counting chain during the time required for the wheel 10 to pass from position 1 to position 2. As the wheel passes from position 2 to position 3, pulses are applied to the counting chain at the input to the second bit. At position 3, the first bit in the counting chain is brought into the circuit again and pulses are applied to the input to this bit instead of the input to the second bit. The counting chain continues to accumulate counts until the wheel reaches the fourth position, at which time the count accumulation is stopped. Each of the counter bits except for the first bit is then read as having a binary value one order less than its normal binary value to effectively subtract one half of the counts accumulated while the wheel moves from position 3 to position 4. For example, the binary information contained in the fourth bit has a decimal value of $2^2$ instead of $2^3$ as would normally be the case. The first bit is not read at all. Thus, the count read out from the counting chain is equal to the number of counts which accumulate as the wheel 10 passes from the center line of the wheel detector 14 to the center line of the wheel detector 20.

Figure 3:
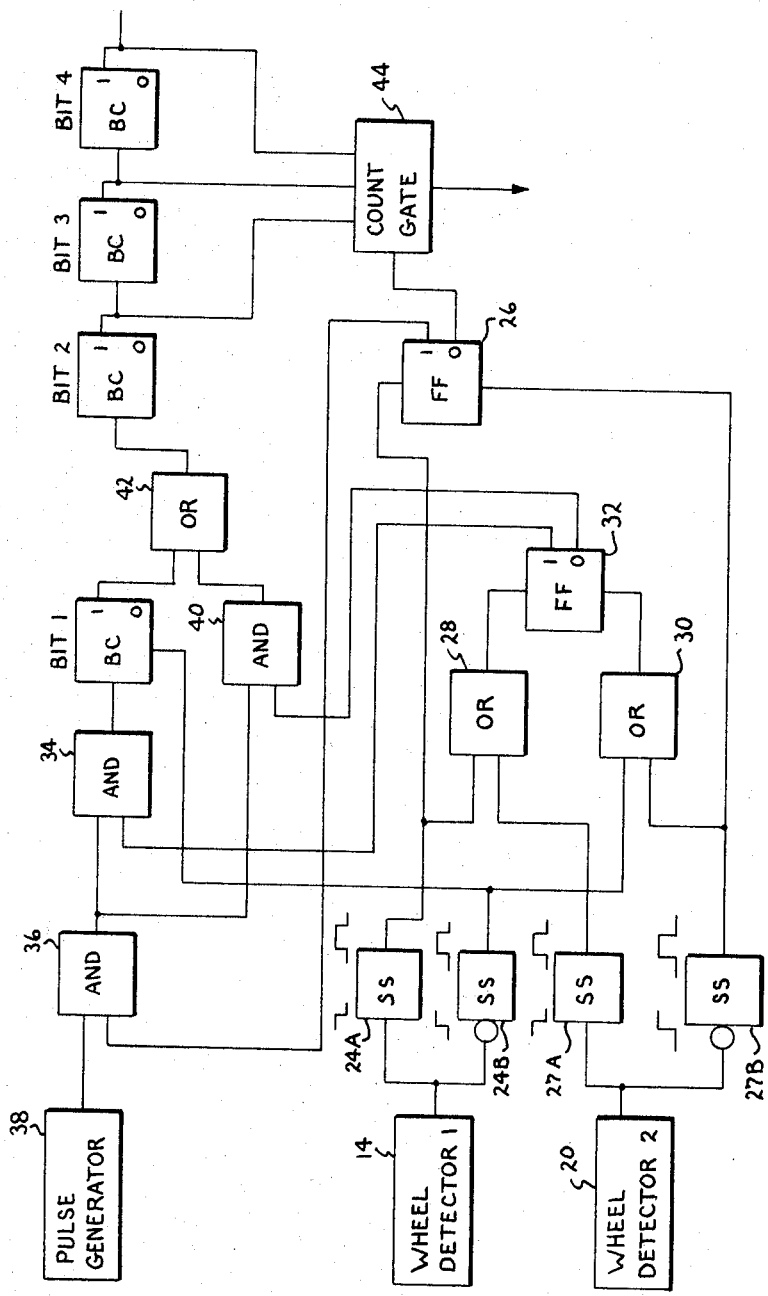
FIG. 3 is a logic diagram showing the details of one embodiment of a circuit built in accordance with the present invention.

A logic circuit for accomplishing this is shown in FIG. 3. The first wheel detector 14 provides an input to a monostable multivibrator or single shot 24A having its output terminal connected both to an OR gate 28 and to the set terminal of a bistable multivibrator or flip-flop 26. The output terminal of a second single shot 24B connected to wheel detector 14 provides one input to a second OR gate 30 and is also connected to the reset terminal of a binary counter element, referred to hereafter as BIT 1. The second wheel detector 20 similarly provides an input to a third single shot 27A having its output terminal connected to the second input of OR gate 28. The output terminal of a fourth single shot 27B connected to wheel detector 20 is connected both to OR gate 30 and to the reset terminal for the flip-flop 26.

The OR gate 28 is connected to the setting terminal for a bistable multivibrator or flip-flop 32 whereas the OR gate 30 is connected to the reset terminal for that flip-flop. A normal output terminal of the flip-flop 32 is connected to one input of AND gate 36 interposed between a pulse generator means 38 and BIT 1. The second input for the AND gate 36 is connected to the normal output terminal of flip-flop 26. The flip-flop 32 has its inverted output terminal connected to one input of an AND gate 40, the other input of which is connected to the output of the AND gate 36. The output of the AND gate 40 and the normal output of BIT 1 are applied to an OR gate 42, the output of which is connected to the input of BIT 1. BITS 1, 2, 3, and 4 form a conventional binary counting chain capable of accumulating counts when pulsed by the pulse generator 38. While the counting chain illustrated contains just four bits, this is for convenience only. The actual number of bits required depends on the spacing of the detectors and the minimum speeds at which a railroad train passing over the detectors would travel. The normal output terminals of BITS 2, 3 and 4 are connected to a count gate 44 which remains in an inhibited condition so long as the flip-flop 26 is in its set condition. When the flip-flop 26 is in its reset condition, the binary one signal appearing on the inverted output terminal of that flip-flop enables the count gate 44 to permit the binary contents of BITS 2, 3 and 4 to be read out.

The operation of this circuit is as follows. Before the wheel 10 reaches position 1, flip-flop 26 is in its reset condition. The AND gate 36 is inhibited to prevent the pulses from the pulse generator 38 from being applied to the counting chain. When the wheel reaches the position 1, wheel detector 14 produces a first signal, the loss of voltage upon the opening of switching member 16, which is applied to the single shot 24A. The single shot 24A produces a voltage pulse which is applied to the flip-flop 32 through OR gate 28 and to the flip-flop 26 to set both of these flip-flops. The setting of the flip-flop 26 inhibits the count gate 44 and enables the AND gate 36. The setting of the flip-flop 32 inhibits the AND gate 40 and enables the AND gate 44. Pulses produced by the pulse generator 38 are applied through the AND gates 34 and 36 to the complete counting chain consisting of BITS 1 through 4.

When the wheel 10 reaches position 2, the closing of the switch member 16 causes a voltage rise which is applied to the single shot 24B by the wheel detector 14. A pulse is generated by single shot 24B and is applied to one input of an OR gate 30 to reset the flip-flop 32, thereby inhibiting the AND gate 34 and enabling the AND gate 40. The same pulse is applied to the reset terminal of BIT 1 to reset that bit. Pulses produced by the pulse generator 38 are now transmitted through the AND gate 36, the AND gate 40, and the OR gate 42 to the input of BIT 2 of the counting chain. While the wheel 10 moves from position 2 to position 3, BIT 1 is completely inoperative.

However, when the wheel 10 reaches position 3, the loss of voltage caused by the opening of the switching member 22 of the wheel detector 20 acts as a first signal which is sensed by the single shot 27A. The single shot 27A emits a pulse which is applied through OR gate 28 to the set terminal of flip-flop 32. When flip-flop 32 sets, the AND gate 34 is enabled while the AND gate 40 is inhibited so that pulses are once again applied to BIT 1 of the counting chain. The complete counting chain continues to accumulate counts as the wheel moves from position 3 to position 4. At position 4, the voltage rise caused by the closing of the switching member 22 causes the single shot 27B to emit a pulse to reset flip-flop 32. This pulse is also applied to the reset terminal of the flip-flop 26. When the flip-flop 26 resets the resultant binary zero at its normal output terminal causes AND gate 36 to be inhibited so that the output of the pulse generator 38 is isolated from the counting chain. At the same time, the binary one signal appearing on the inverted output terminal of the flip-flop 26 enables the count gate 44, allowing the binary contents of BITS 2 through 4 to be read out.

As indicated earlier, the binary value of the data contained in BITS 2 through 4 is considered to be one order of magnitude less than the normal. For example, if BITS 3 and 4 each contained a binary one while BIT 2 contained a binary zero, the decimal value of the number contained in these BITS would be six.

Although there has been described at present what is thought to be a preferred embodiment of the present invention, it is obvious that variations and modifications will occur to those skilled in the art. For example, while the description has been in terms of magnetic detectors for use with railroad car wheels, it is obvious that any type detector having a symmetrical response about a center line might be used.

What I claim is:

1. A speed-measuring apparatus for use with a pair of spaced wheel proximity detectors, each of which produces a first signal as an approaching vehicle wheel moves within a certain distance of the detector and a second signal as the same wheel moves the same distance beyond the detector, said system including:
   (a) a counting chain;
   (b) pulse generator means for applying pulses to said counting chain to cause said counting chain to accumulate counts at a predetermined rate during the time interval between the first signal produced by the first detector approached and the second signal produced by the second detector approached; and
   (c) circuit means for subtracting substantially one-half the counts accumulated during the time interval between the first and second signals produced by the first detector and during the time interval between the first and second signals produced by the second detector from the total accumulated count to produce a modified accumulated count having a magnitude directly proportional to the time interval required for the vehicle wheel to travel from a position directly over the first detector to a position directly over the second detector.

2. A speed-measuring system as recited in claim 1 wherein said circuit means includes:
   (a) first circuit means responsive (1) to the first signal produced by the first detector to gate pulses from said pulse generator means to the first bit of said counting chain, and (2) to the second signal produced by the first detector to remove the first bit from the counting chain, reset the first bit, and gate pulses to the second bit in said counting chain; and
   (b) second circuit means responsive (1) to the first signal produced by the second detector to gate pulses to the first bit, and (2) to the second signal produced by the second detector to inhibit the gating of pulses to said counting chain and to permit the readout of all bits of said counting chain except the first bit.

3. A speed measuring system as recited in claim 2 wherein said first circuit means includes:
   (a) a first AND gate having one input terminal connected to the output terminal of said pulse generator means;
   (b) a second AND gate having one input terminal connected to the output terminal of said first AND gate and having an output terminal connected to the input terminal of the first bit in said counting chain;
   (c) a third AND gate having one input terminal connected to the output terminal of said first AND gate and an output terminal connected to the input terminal of the second bit in said counting chain;
   (d) a first bistable circuit means connected to the first detector and the first AND gate, said circuit means being set in response to the first signal from the first detector to enable said first AND gate; and
   (e) a second bistable circuit means connected to the first detector, said second AND gate, and said third AND gate, and responsive to the second signal from the first detector to inhibit said second AND gate and enable said third AND gate.

References Cited

UNITED STATES PATENTS

| | | | |
|---|---|---|---|
| 3,127,768 | 4/1964 | Mason | 324—70 |
| 3,281,593 | 10/1966 | Mendelsohn | 246—249 |
| 3,381,219 | 4/1968 | Dumbeck | 324—70 |
| 3,395,341 | 7/1968 | Malaquin | 324—70 |

RUDOLPH V. ROLINEC, *Primary Examiner.*

M. J. LYNCH, *Assistant Examiner.*

U.S. Cl. X.R.

235—150.2; 246—182